United States Patent [19]
Shank

[11] 3,973,873
[45] Aug. 10, 1976

[54] NEGATIVE TORQUE SENSOR FOR A GAS TURBINE ENGINE

[75] Inventor: Wayne C. Shank, Tucson, Ariz.

[73] Assignee: Avco Corporation, Williamsport, Pa.

[22] Filed: Apr. 4, 1975

[21] Appl. No.: 565,155

[52] U.S. Cl. ................................ 416/43; 416/36; 416/160
[51] Int. Cl.² ........................................ B64C 11/40
[58] Field of Search .................... 416/43, 36, 160

[56] References Cited
UNITED STATES PATENTS

| | | | |
|---|---|---|---|
| 2,751,026 | 6/1956 | Lee | 416/43 |
| 2,801,701 | 8/1957 | Coar | 416/43 |
| 2,942,673 | 6/1960 | Bogue | 416/43 |
| 2,951,543 | 9/1960 | Peterson | 416/43 X |
| 2,959,228 | 11/1960 | Larkin et al. | 416/43 |
| 2,988,153 | 6/1961 | Haworth et al. | 416/43 |
| 3,253,658 | 5/1966 | Bradley | 416/43 |

FOREIGN PATENTS OR APPLICATIONS 217,664  11/1957  Australia ............................. 416/43

Primary Examiner—Everette A. Powell, Jr.
Attorney, Agent, or Firm—Charles M. Hogan; Irwin P. Garfinkle; Robert J. McNair, Jr.

[57] ABSTRACT

A negative torque sensing and control system is disclosed which is useful with a differential geared or fixed shaft gas turbine engine of the type installed in general aviation aircraft. Negative torque is sensed in the gear train between the propeller and the aircraft engine whenever there is a powerplant failure. When the reverse torque exceeds a selected threshold, hydraulic valves are actuated which remove oil pressure from the pitch control mechanism of the propeller. Loss of oil pressure causes the propeller to assume the feathered position.

8 Claims, 4 Drawing Figures

NEGATIVE TORQUE SENSOR FOR A GAS TURBINE ENGINE

BACKGROUND OF THE INVENTION

This invention relates to simplified automatic means for feathering the propeller of a turboprop aircraft when there is a powerplant failure. The system was designed for feathering the pitch of a variable pitch propeller of the type using Beta control. Beta control simply implies a mode of operation wherein the pilot has direct control of the blade angle of the propeller while the fuel governor maintains the desired engine r.p.m. My invention was implemented on a quick-acting propeller having Beta pitch control through the center of the propeller drive shaft.

Other type of negative torque sensors have been built for use with aircraft gas turbine engines. U.S. Pat. No. 2,801,701 by Coar describes an automatic feathering control system whose applicability is limited to free turbine systems. Further, Coar requires an oil system independent of the engine oil system which is all that is needed with my invention. Thus, Coar needs special pumps, reservoirs and plumbing not required by my system. In U.S. Pat. No. 2,955,658 by Lombard, the negative torque sensing linkage is interconnected with the constant speed control unit. As a result, the control system is arranged so the reverse torque sensor cannot feather the propeller when the throttle lever is in a low power or idle setting.

The U.S. Pat. No. 2,959,228 by Larkin contemplates a much more complex control system than is desired for use on a general aviation type aircraft piloted by a single individual. In Larkin, automatic feathering of the propeller is intended for use on take-off only. In the cruise flight condition, arming and throttle control disable the automatic feathering feature. The torque sensing and control system of Larkin is dependent on an electrical source and will automatically feather a propeller only when there is an engine failure during the full power-take-off portion of the flight regime. Even then the circuit must have been pre-armed by the pilot. My invention, in contrast, requires no electrical power source since it functions hydraulically. Additionally, my system is always functional and automatically recycles to a neutral state after feathering the propeller.

SUMMARY OF THE INVENTION

The invention pertains to a negative torque sensor and propeller feathering system useful on a turboprop aircraft engine. Negative torque sensing is accomplished in combination with the unit which measures the positive torque output of the engine. Both the sensing of negative torque (the condition where the propeller is trying to drive the engine) and the foot pound value of positive torque are measured at the stator carrier ring gear of the planetary gear train which connects the gas turbine engine to the propeller. The torque meter unit is of conventional design, being generally similar to the one described in the U.S. Pat. No. 2,461,001 by Palen. In my implementation, torque forces necessary to restrain the stator carrier gear of the planetary gear train are absorbed by an annular ring under both positive and negative torque conditions. Under positive torque conditions the annular ring will try to move in a direction opposite to that which occurs for negative torque conditions. This difference is utilized by having a tab extend outward from the annular ring. Under positive torque conditions the tab abuts a fixed stop which reacts to the torque being delivered to the propeller by the engine. Under negative torque conditions, the tab rotates away from the stop until it displaces a rocker arm which in turn actuates the plunger of an oil pressure valve. Actuation of this valve signals the oil pressure dump valve in the pitch control mechanism of the propeller. Dumping of oil pressure in the variable pitch mechanism of the propeller causes it to turn to the feathered position.

The invention is aimed at making general aviation aircraft safer to operate in that the negative torque sensor functions automatically and there are no enabling or lock-out switches which the pilot must actuate.

DESCRIPTION OF PREFERRED EMBODIMENT

Figure 1:
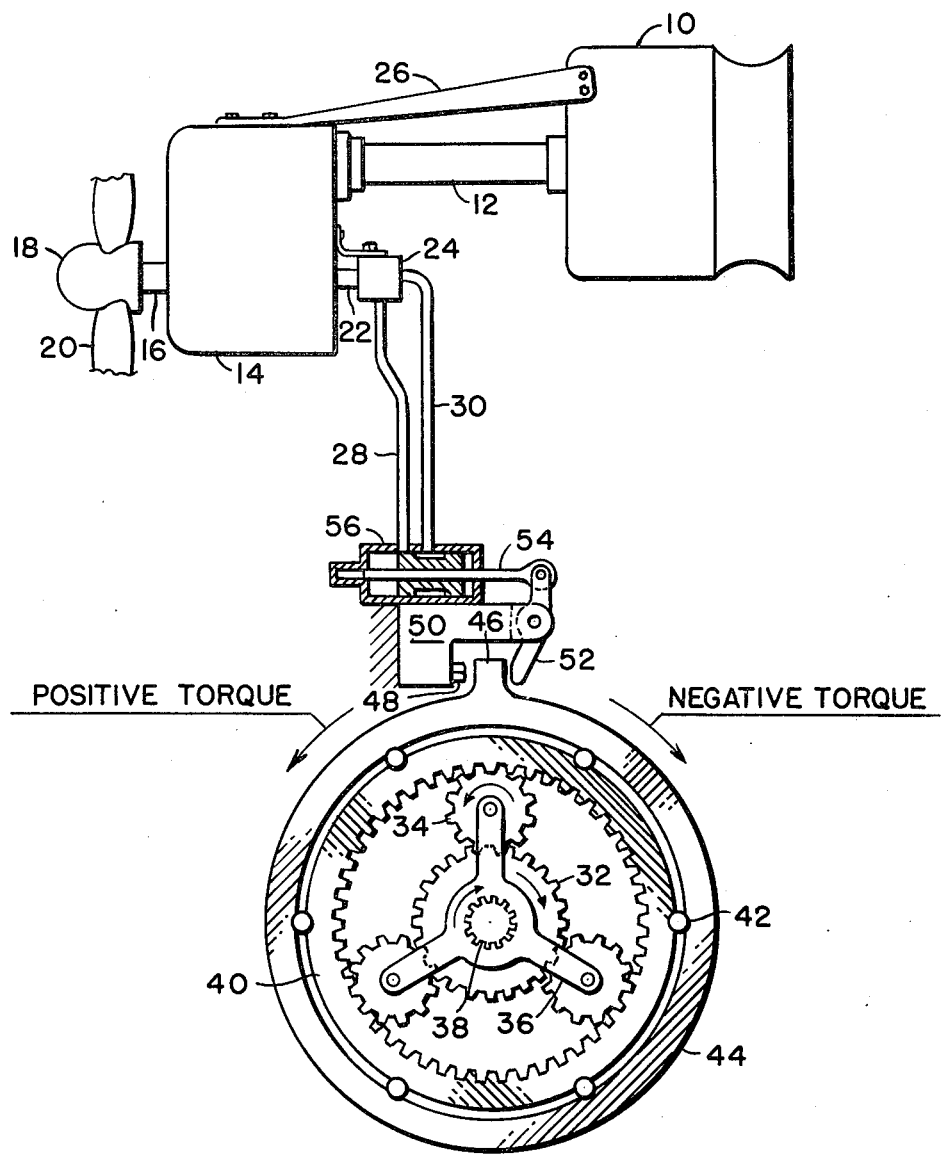
FIG. 1 is a schematic and diagrammatic representation of the invention.

The upper portion of FIG. 1 shows an aircraft power plant of the turboprop type. In the power plant there is a gas turbine 10 connected by drive shaft housing 12 to a reduction gear case 14. Rotation of the drive shaft in housing 12 operates the planetary gears in case 14 to drive propeller shaft 16 on which are mounted variable pitch propeller mechanism 18 and variable pitch blades 20. The variable pitch propeller may be a Hartzell or similar quick-acting type which utilizes Beta control through the center of the propeller shaft. In terms of hardware, the pitch control mechanism is spring loaded and counter-weighted to feather in the absence of oil pressure. Propeller pitch control pressure is delivered to the propeller via a rotating tube which moves fore and aft within hollow drive shaft 16. The fore and aft motion of tube 22, the Beta tube, is directly proportional to the pitch angle of the propeller blades 20. Beta tube 22 extends completely through gear case 14 and terminates at Beta servo 24 which in an actual power plant will be fastened to the engine control section (not shown).

The reduction gear case 14 is shown as supported to the engine by strut 26. Strut 26 is intended as symbolic because in actual practice there will be air intakes and other control mechanisms which closely integrate the aircraft power plant into a composite whole.

The reduction gearing in case 14 may be of any suitable type. However, in the preferred embodiment, there is a planetary gear set comprising an input member, an output member and a rotatable reaction member. The input member is arranged to be driven from a bull gear which in turn is driven by a pinion gear mounted on the engine shaft. Use of a pinion and bull gear arrangement reduces engine speed at least 6 times at the planetary pinion input.

The planetary portion of the reduction gearing is shown in the lower portion of FIG. 1. There is an input sun gear 32 which is connected to be driven by the engine in a clockwise direction. Sun gear 32 drives planet pinions 34, rotatably mounted on output planet carrier 36. Planet carrier 36 has spline teeth 38 which accepts the splined end of propeller shaft 16. The outer periphery of planet pinions 34 meshes with the rotatable reaction member, ring gear stator carrier 40. Balls 42 serve no direct function in negative torque sensing, being located as shown because they are part of an instantaneous torque meter sensor.

Ring stator disk 44 has a tab 46 projecting therefrom which for positive torque conditions abuts stop 48 that connects to stationary housing 50. Conversely, under negative torque conditions, that is, for the case where the propeller is trying to drive the engine, ring stator 44 will attempt to turn in a clockwise direction. When tab 46 begins moving to the right, as shown in FIG. 1, rocker arm 52 will be actuated such that piston 54 will be pressed inward into reverse torque sensing valve 56. Valve 56 is of the porting type wherein depression of shaft 54 will open ports which effectively couple the contents of tubes 28 and 30. If tube 30 contains engine oil at operating pressure, then actuation of valve 56 due to presence of negative torque will result in tube 28 signaling Beta servo valve 24 to operate the pressure dump valve of the Beta pitch control mechanism. In the absence of oil pressure the propeller will feather. The status of the pressure dump valve will normally be signaled to the pilot via a visual indicator light on his control console.

In the actual construction the planetary gear train is not arranged radially outward as shown in the lower portion of FIG. 1. Rather, it is folded over, as will be described in detail by reference to FIG. 2.

Figure 2:
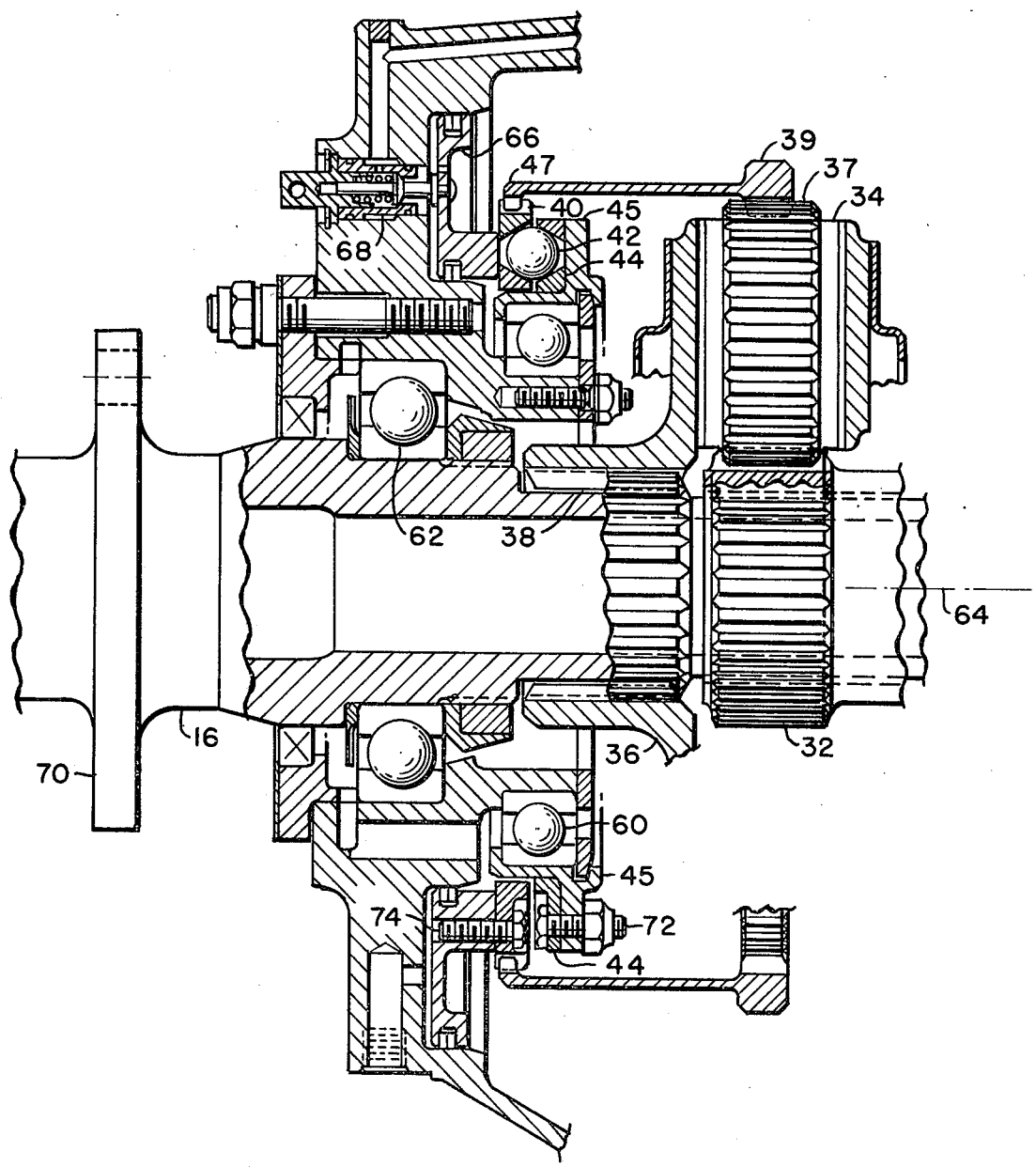
FIG. 2 is a cross-sectional view of the planetary gear train showing the manner in which torque is measured and the collaboration between positive and negative torque sensing.

In FIG. 2, sun gear 32 will be driven by the gas turbine engine and, due to reduction gearing (not shown), operate at a speed which may be 15 percent or so of engine r.p.m. Sun gear 32 drives planet pinion gear 34 which is rotatably mounted on planet carrier 36. Thus far, the FIG. 1 and FIG. 2 implementations coincide. In FIG. 2, it is shown that in the actual system reduced to practice, planet pinion gear 34 mates with gear teeth 37 which are formed on the inner flange of stator carrier hub 39. The other end of hub 39 is secured by means of teeth 47 to stator carrier ring gear 40. Stator carrier ring gear 40 has a multiplicity of conically shaped recesses around its sides, into each of which a ball 42 nests. As may be seen from FIG. 2, stator carrier 40 is an annular ring with teeth around its outer circumference and with its inner circumference slidably supported on the flanged surface of rotatably mounted hub element 45. Balls 42 also nest in mating conically shaped recesses cut in ring stator element 44. Ring stator disk 44 is secured to rotatably mounted hub 45 by means of bolts 72. Hub 45 is supported in position by ball bearing 60.

Under normal operating conditions wherein the engine is driving sun gear 32, the stator carrier hub 39 is held stationary by means of a tab which extends from ring stator 44. This is best seen by reference to FIG. 3 where a side view of ring stator disk 44 shows that there is a tab 46 extending therefrom. Under positive torque conditions ring 44 will try to rotate in a couterclockwise direction. In doing so, tab 46 abuts stop 48 which consists of a bolt affixed to stationary housing member 50.

With ring stator 44 thus locked into position for positive torque conditions, the operation of the torque meter mechanism can be described with reference to FIG. 2. Application of torque to the planetary gear train results in a resistive force appearing at balls 42. Ring 44 is held by the stop (tab 46 abutting stop 48) and stator carrier 40 wants to turn. As the force between elements 40 and 44 increases, the balls 42 tend to be forced out of their neutral positions. They do this by tending to roll up the conical side of the recess, forcing rings 40 and 44 to move apart. Ring 44 is held laterally fixed by flange 45. Thus, any separation of rings 40 and 44 comes about through lateral motion of stator carrier ring 40. Lateral motion of ring 40 is controlled by flanged disk 66 to which it is secured by means of bolts 74. Flange disk 66 is in turn connected to piston valve 68 which is connected to a source of hydraulic oil pressure. The magnitude of the pressure available must be adequate to balance the axial torque reaction on flanged disk 66 under maximum torque operating conditions. In any case, the reaction of ring 40 to the build-up of engine torque causes ring 40 to try to move laterally to the left, as seen in FIG. 2. As it moves leftward, disk flange 66 depresses the piston of valve 68. Depression of the piston causes additional high pressure fluid to be introduced into the body of the valve, creating added back pressure against the piston. This balances out the lateral forces on stator ring 40. Measurement of the hydraulic pressure needed to balance the forces applied to the two sides of disk flange 66 provides an indication of the torque being handled by the planetary gear train.

For the negative torque condition let us assume that the engine failed due to a sudden malfunction while the aircraft was flying along at 300 mph. Propeller blades 20 would be windmilling. Propeller hub assembly 18 would be fastened to shaft 16 via hub flange 70 (see FIG. 2). Shaft 16 which rides on bearing 62 would drive planet carrier 36 via spline teeth 38. This action would serve to rotate planet pinion gears 34, driving sun gear 32 and hence the engine. The result would be that the windmilling propeller would place a heavy drag on the aircraft, or at least on that side having an engine failure if the plane was equipped with more than one engine.

Figure 3:
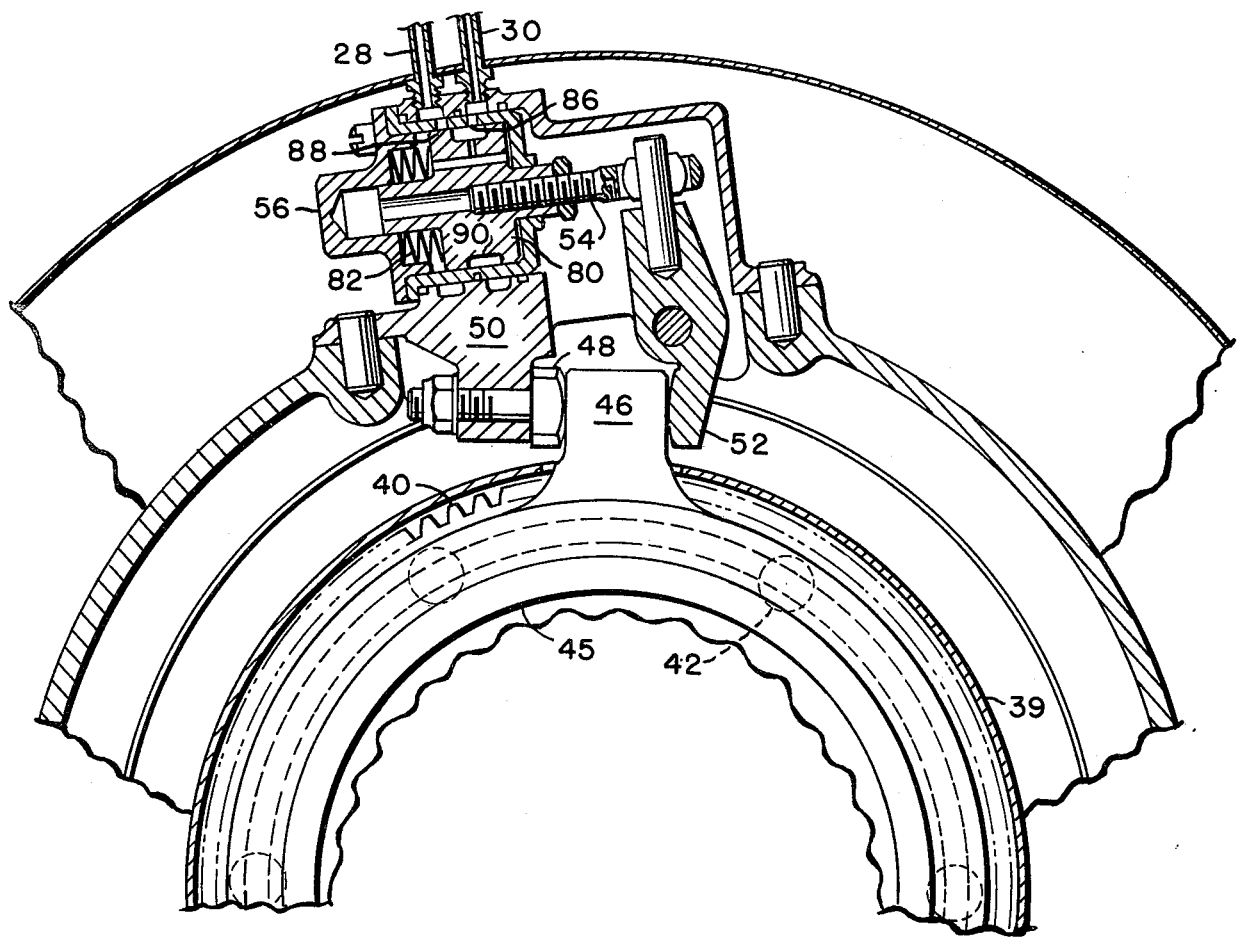
FIG. 3 shows the valving mechanism for signaling that the propeller should be feathered.

The negative torque created by the windmilling propeller would serve to make ring stator 44 rotate in the opposite direction from which it was trying to turn under positive torque conditions. Since ring stator 44 is fixedly attached to the flanged portion of hub 45, there is very little friction impeding its motion. This results from the use of ball bearing 60. Referring to FIG. 3, negative torque causes clockwise motion of ring stator 44. Clockwise movement separates tab 46 from stop 48. However, as tab 46 moves away from stop 48 it begins to actuate rocker arm 52 which depresses plunger 54 in valve 56.

Valve 56 is comprised of a spool 80 which rides against Bellville spring 82. Pushing of plunger 54 moves spool 80 so that ring-shaped cavity 90 connects orifice 86 with orifice 88. In my implementation I then connect orifice 86 to a source of engine oil pressure via supply tube 94. Counter-clockwise rotation of rocker arm 52 then serves to actuate valve 56 so that engine oil pressure is then supplied via tube 92 to be used for feathering the propeller.

Spring 82, shown in FIG. 3 as a Bellville, can be made to allow pitch control initiation at any desired negative torque value. This is accomplished by contouring the spring to resist clockwise movement of tab 46 in a prescribed way, both as to the point of initiation of oil flow through valve 56 and the point of full actuation.

The propeller feathering profile is thus directly related to flexing profile of spring 82.

Figure 4:
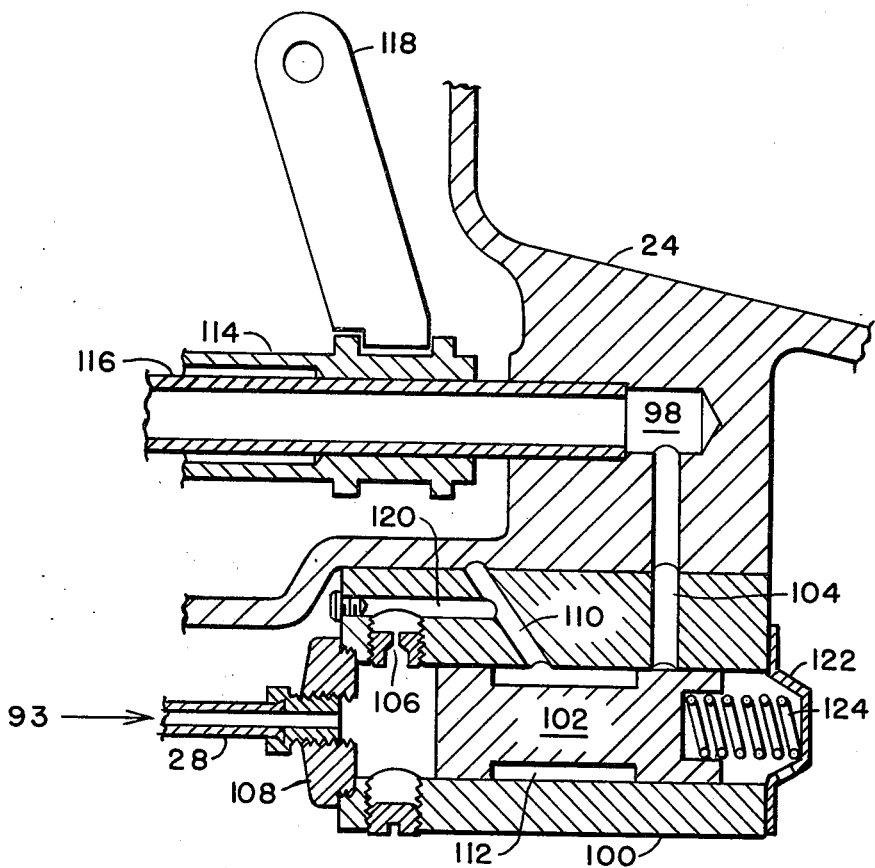
FIG. 4 shows the pressure dump valve on the Beta sevo.

In FIG. 4 there is shown the pressure dump valve with which valve 56 communicates. Oil flows into dump valve 100 at point 92 via tube 28 which connects with fitting 92 (see FIG. 3). Oil pressure entering valve 100 serves to actuate spool piston 102 pressing it against spring 124 which is held at one end by retainer cap 122. When piston 102 has moved a short distance to the right, as shown in FIG. 4, port valves are uncovered such that passageway 104 can begin communicating with passageway 110. Passageway 104 is connected to passageway 98 which is along the centerline of the Beta control propeller pitch regulating mechanism. Absence of oil pressure in passageway 98 causes the propeller to automatically assume the feathered condition.

This is exactly what happens when piston 102 is actuated to the right, as shown in FIG. 4. Passageway 104 begins to communicate with passageway 110 as soon as recess 112 of piston 102 uncovers the port valve at the end of passageway 104. Passageway 110 has no back oil pressure since it returns oil flowing therethrough to the oil sump. Orifice 106 bleeds off residual pressure in tube 28 via passages 120 and 110 into the oil sump as soon as the propeller reaches its feathered position. This relieves the pressure on piston 102 and spring 124 pushes it back to the original state, again closing the end of passageway 104.

Normal control of propeller pitch is accomplished by control linkage 118 acting on the Beta control mechanism which is actuated by the axial motion of tubes 114 and 116 within propeller shaft 16. The Beta control mechanism is mounted concentric with centerline 64 (see FIG. 2).

Having described my invention in detail in its present preferred embodiment, it is obvious that those who have skill in the art will be able to devise changes and modifications without departing from the spirit and scope thereof. For example, a combination of electrical and hydraulic controls can be used or an electric lockout can be added for situations wherein the pilot does not want a propeller to be able to automatically shift to the feathered position under any and all conditions.

I claim:

1. Negative torque sensing and propeller feathering apparatus for use on aircraft having a variable pitch propeller, said propeller feathering apparatus including both a mechanism for varying the pitch of said propeller and a source of oil pressure applied to said mechanism, the pressurizing of said source enabling the setting of the pitch of said propeller, said propeller returning to a feathered state when the pressure of said source is reduced below a predetermined level, said propeller being coupled to a gas turbine engine through planetary gearing including therein an input member, an output member and a rotatable reaction member, said torque sensing and feathering apparatus comprising:

an annular disk rotatably mounted concentric with the axis of said reaction member;

coupling means from said disk to said reaction member for transferring reaction forces to said disk in response to torque being applied to said planetary gearing, said coupling means including a torque indicator for providing instantaneous indications of torque applied to said planetary gearing;

means for providing an angular stop for said disk, said means providing reaction for said reaction member in response to positive torque applied to said planetary gearing from said engine;

means responsive to angular motion of said disk away from said positive stop in response to negative torque applied to said output member from said propeller for rapidly reducing the pressure of said source below said predetermined level for altering the pitch of said propeller to its feathered position; and means responsive to a decrease in negative torque for automatically enabling the repressurizing of said source.

2. The invention as defined in claim 1 wherein said input member is a driven sun gear, said output member is a rotatable planet carrier and said reaction member is a ring gear, said carrier supporting a plurality of planet pinion gears rotatable between said sun gear and said ring gear.

3. The invention as defined in claim 1 wherein said means for providing an angular stop comprises a fixed tab extending from said disk, a stationary means positioned in the path of rotation of said tab, said tab and said stationary means providing said angular stop.

4. The invention as defined in claim 3 wherein said coupling means comprises:

a reaction transfer assembly including a member with lateral movement away from said disk in response to application of torque to said reaction member of said planetary gearing; and means for resisting lateral movement of said reaction transfer assembly, the resulting force being a function of torque.

5. The invention as defined in claim 3 wherein said means responsive to angular motion of said disk comprises valve means having a plunger displaceable by a rocker arm, said arm being in the path of rotation of said tab away from said positive stop in response to negative torque applied to said input member, movement of said arm actuating said valve means.

6. The invention as defined in Claim 5 wherein said valve means comprises:

a first valve operable by said rocker arm in response to movement of said tab away from said stop whenever negative torque is transmitted from said propeller to said engine;

means supplying oil pressure from said source to said first valve; and a second valve operatively connected to said first valve and arranged for acting to reduce oil pressure applied to said mechanism for causing said propeller to turn to its feathered position on receiving a positive oil pressure signal from said first valve.

7. The invention as defined in claim 6 wherein said first valve includes a spring contoured to resist motion of said tab away from said positive stop until a prescribed value of negative torque has been reached.

8. The invention as defined in claim 1 wherein the coupling means from said annular disk to said reaction member includes:

a stator carrier ring gear concentric with and adjacent to said disk, being on its inner circumference slidably supported on the flanged surface of said disk and having on its periphery gear teeth which mate with gear teeth milled on the inner flange of said stator carrier gear;

a multiplicity of balls nested in complementary frusto-conically shaped recesses cut in adjacent sides of said disk and said stator carrier ring gear whereby torque forces between said disk and said stator carrier are converted into lateral motion of said stator carrier ring gear with respect to said disk;

means including a valve assembly responsive to lateral motion of said stator carrier ring gear;

means to supply pressure fluid to the piston of said valve assembly to resist said lateral motion of said stator carrier ring gear; and means responsive to fluid pressure in said valve assembly for indicating torque.

* * * * *